(Model.)

D. P. WEIR.
Fluid Meter.

No. 234,898.

2 Sheets—Sheet 1.

Patented Nov. 30, 1880.

WITNESSES.
Geo. A. King
Benj. K. Prentiss Jr.

INVENTOR.
Daniel P. Weir by his
att'y Chas. Allen Taber (Model.)

2 Sheets—Sheet 2.

D. P. WEIR.
Fluid Meter.

No. 234,898.   Patented Nov. 30, 1880.

WITNESSES.
Geo. A. King
Benj. K. Prentiss Jr.

INVENTOR.
Daniel P. Weir by his att'y
Chas. Allen Taber.

UNITED STATES PATENT OFFICE.

DANIEL P. WEIR, OF SALEM, MASSACHUSETTS, ASSIGNOR OF ONE-HALF TO JOHN JACKSON, OF SAME PLACE.

FLUID-METER.

SPECIFICATION forming part of Letters Patent No. 234,898, dated November 30, 1880.

Application filed May 15, 1880. (Model.)

*To all whom it may concern:*

Be it known that I, DANIEL P. WEIR, of Salem, in the county of Essex and State of Massachusetts, have invented new and useful Improvements in Fluid-Meters, of which the following is a specification, reference being had to the accompanying drawings, like letters indicating like parts in the different figures.
My invention relates to meters for measuring the amount of water or other fluid which shall be made to pass through them.

All the other meters of which I have knowledge are either so complex in construction as to be liable to get out of order, and are too costly for common use, or do not perform the work of measuring accurately, many of them being so constructed that they can be set so that fluids will pass through them without making any record.

My meter is simple, of few parts, and not liable to get out of order; but no fluid can be passed through it, even in ever so small a stream, without leaving a correct record on the index or register. Being so simple in construction it can be furnished at a very low price.

Figure 2:
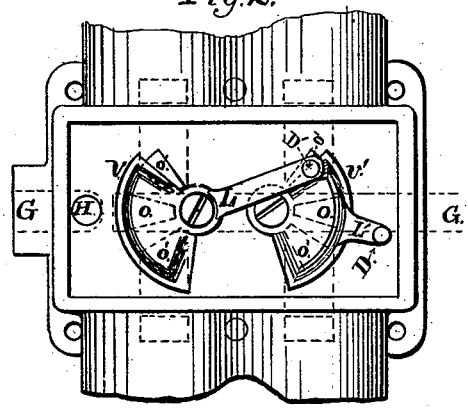
Figure 3:
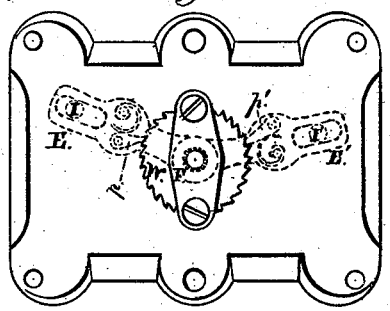
Figure 1:
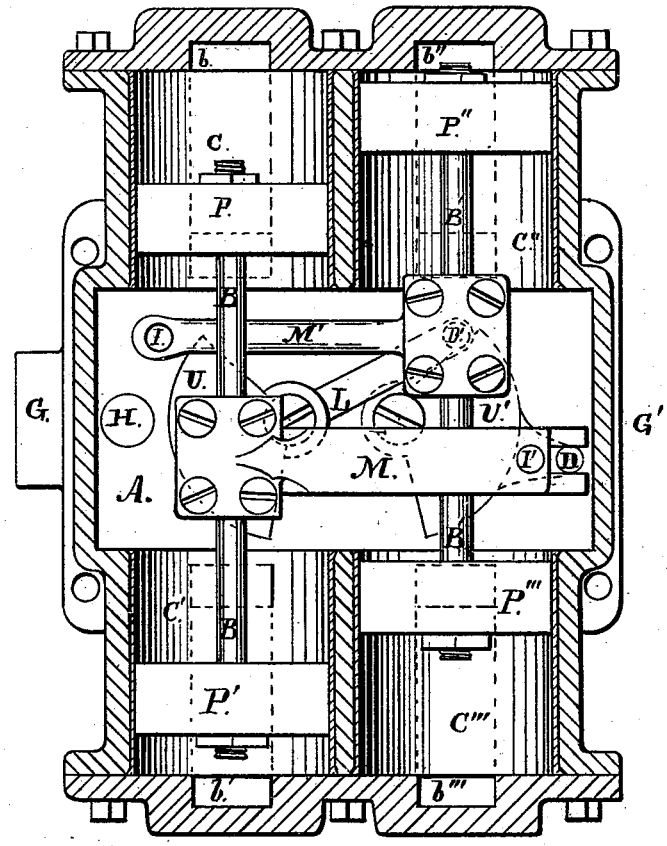
Figure 4:
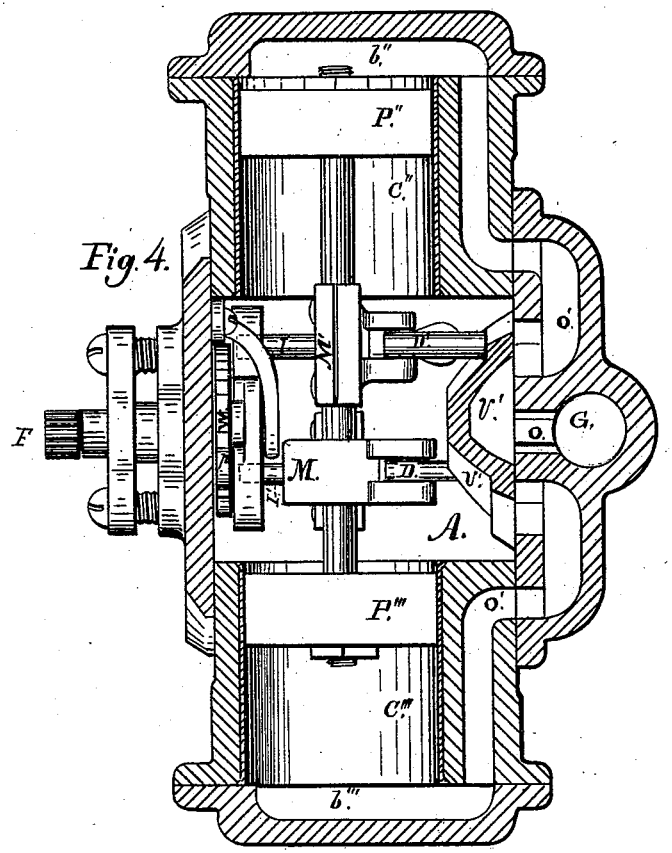
Figure 5:
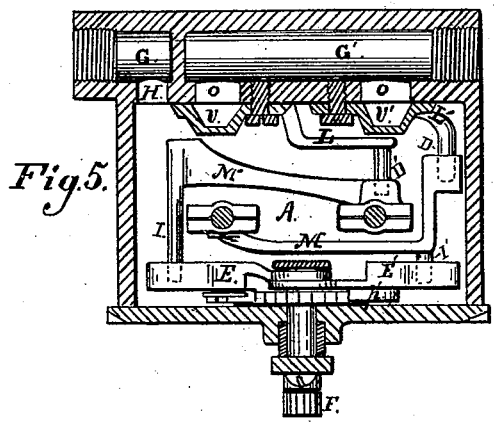

Figure 1 is a vertical section of a meter, showing the pistons and mechanism for moving the valves and register-arms. Fig. 2 shows, on a smaller scale, the valves and openings by which the water or other fluid passes through. Fig. 3 is a view of the removable front of the meter, upon the under or inside face of which the ratchet-wheel and the arms by which it is moved are attached, which arms are operated by the bars M M' attached to the piston-rods. The arms E and E' and ratchet-wheel W are shown by dotted lines. Fig. 4 is a section of the meter from the front to the back, showing the pistons P'' and P''', the ducts for the passage of the fluid to the spaces $b''$ and $b'''$, and the ratchet-wheel and pinion F with one pawl-bearing lever. Fig. 5 is a horizontal section of the meter, showing the bars, arms, and levers more clearly.

The central valve-chamber, A, has two pairs of cylinders, C C' and C'' C''', all of the same dimensions. Moving in the pair of cylinders on the left are pistons P and P', connected by a rod, B. Moving in the right-hand pair are pistons P'' and P''', connected by a rod, B'.

The bar M is made fast to the piston-rod B and controls the action of the valve V' by means of the pin D. It also moves the lever E, Fig. 3, (one of two levers which act upon the ratchet-wheel W,) by means of the pin I', Fig. 3. The bar M' is made fast to the right-hand piston-rod B', and controls the action of the valve V by means of the arm L and the pin D'. It also moves the lever E' (one of two levers which act upon the ratchet-wheel W) by means of the pin I.

The register is upon the outside of the front of the meter, and may be of ordinary construction. Only the pinion F is shown in the drawings, Fig. 3.

The back of the valve-chamber is cast with certain ducts. On the left, in Figs. 1 and 2, is shown an opening, G, to receive the water under pressure which passes into the valve-chamber at H. The whole meter is full of water all the time.

O O, Fig. 2, are openings or outlet-ports, which allow the fluid to pass off at G' by means of a duct in the back of the valve-chamber from O to G'. These openings O and O are in the position shown in Fig. 2, and are of a size sufficient for the free passage of the fluid and in the form of a sector of a circle, or very nearly so, the said sector being about one-twelfth of the circle of which it might form a part.

On both sides of each of the outlet-ports, and of the same size and shape with them, and being very nearly equal sectors of the same circle, but not extending quite to the center of the circle, and separated from the outlet-ports by other equal sectors of the same circle, are what may be called the "cylinder-ports" O' O' O' O', Fig. 2, openings in the back of the valve-chamber, through which the fluid may pass to the spaces $b\ b'\ b''\ b'''$, Fig. 1, one space being at the end of and open to each of the cylinders, each port being thus connected by a duct to the space at the outer end of the cylinder nearest to it. The valves which open and close these ports are each shell-shaped sliding valves, covering an area of about five-twelfths of the circle of which the ports are sectors. they vibrate on what would be the centers of said circles, and are moved by the bars M and M′, the arms L and L′, and the pins D and D′.

The valve for the right-hand ports is moved by the left-hand piston-rod, and the valve for the left-hand ports is moved by the right-hand piston-rod. The arm by which the valve V is moved is attached to the center of said circle or pivotal point; but the arm by which the valve V′ is moved is attached to the circumference. This arrangement gives the reverse action necessary for the proper operation of the pistons. A portion of each valve is raised, making a box or shell with the under side open, having a flat flange working water-tight. These valves shut at all times the direct passage of the fluid from the valve-chamber to the outlet-ports O O, but permit, as the valves vibrate, the alternate passage of the fluid from the valve-chamber to one of the spaces $b$ $b'$ $b''$ $b'''$, and from one of these spaces to the cylinder-ports and under the valves to the outlet.

The operation of the meter may be more particularly described as follows, Fig. 1 representing both pairs of pistons as being on their way down. The pistons work as if they were attached to a quarter-crank. The bar M, attached to the left-hand piston-rod, has so controlled the valve V′ that it has opened the cylinder-port to allow the escape of the fluid from $b'''$ through the outlet O, and to allow the pressure of the fluid on the piston P″ through its port to the passage $b$. The bar M′, attached to the right piston-rod, so controls the valve V that the cylinder-port is open to allow the escape of the fluid from $b'$ and is closing the upper left cylinder-port, and will close it entirely just before the pistons P and P′ reach the end of their stroke. This reduces the velocity of these pistons, bringing them gently to a rest at the end of their cylinders, getting rid of a buffer or cushion, and so that there is no noise or jar at the end of the strokes. For an instant, when the pistons P and P′ are at the ends of their cylinders, the valve V closes both cylinder-ports to the spaces $b$ and $b'$, but at this time the pistons P″ and P‴ are half-way down, their cylinder-ports are wide open, and they are moving at their greatest speed. They are rapidly moving the valve V and quickly reverse it, so as to open the port to the space $b'$, to admit the pressure of the fluid from the valve-chamber, and also the port $b$, to allow of the escape of the fluid in cylinder C through $b$ to the outlet O. The other valve and pistons have the same operation, and by their reciprocal action maintain a continuous motion and keep up a steady discharge of the fluid from the outlet G′. This arrangement gets rid of a crank or cam inside the valve-chamber, necessary in many other kinds of meters.

I have represented the meter as standing on one end, as shown in Fig. 1, but it would work equally well in other positions. If the back were cast flat, so as to make a level base, it might be preferable to have it rest upon the back.

The two levers E and E′ operate the ratchet-wheel W by the help of the pawls or locks $p$ and $p'$, which are pressed against the wheel by springs, as shown in Fig. 3. These levers are moved by the bars M and M′ by means of the pins I and I′. By means of this arrangement any motion of the pistons, whether full or short, will turn the ratchet-wheel in proper proportion to the length of the stroke, and as the cylinders are uniform in size the amount of fluid passing through will be correctly recorded under all circumstances.

The valves are of such a construction that they can at no time, or when in any position, allow any fluid to pass through unless the pistons move.

What I claim is—

1. The combination of the ratchet-wheel W with a registering device, the two arms E and E′, the pawls $p$ and $p'$, the bars M and M′, operated by piston-rods, substantially as described, whereby any movement of the pistons is correctly recorded, as set forth.

2. In a fluid-meter, the combination of two valves, passages for the fluid, two pairs of pistons, two piston-rods, a ratchet-wheel, two levers, each carrying a pawl adapted to engage with said ratchet-wheel, and two arms secured upon and moved by said piston-rods and adapted to engage with and operate the pawl-bearing levers, substantially as described.

3. The valves V and V′, chambered upon one side, and provided with the arms L and L′, in combination with the ports O O O′ O′ O′ O′, the bars M and M′, and the piston-rods B and B′, substantially as described, and for the purpose specified.

DANIEL P. WEIR.

Witnesses:
 PAUL B. PATTEN,
 A. H. PARSONS.